United States Patent

Reis et al.

[11] Patent Number: 6,007,632
[45] Date of Patent: Dec. 28, 1999

[54] SYSTEM AND METHOD FOR IMPREGNATING A MOVING POROUS SUBSTRATE WITH ACTIVE MATERIALS TO PRODUCE BATTERY ELECTRODES

[75] Inventors: Antonio L. A. Reis, Tracy; Rory A. J. Pynenburg, Santa Clara; Zbigniew J. Witko; Marian A. Podstawny, both of San Jose, all of Calif.

[73] Assignee: Vitrom Manufacturing Consultants, Santa Clara, Calif.

[21] Appl. No.: 08/891,657

[22] Filed: Jul. 11, 1997

[51] Int. Cl.$^6$ ........................................... B05C 3/00
[52] U.S. Cl. ............................ 118/686; 118/50; 118/125; 118/126; 118/405
[58] Field of Search ............................ 118/686, 50, 125, 118/126, 404, 405; 427/81, 294; 162/184, 186; 264/257, 273, 101, 511, 571

[56] References Cited

U.S. PATENT DOCUMENTS

| | | | |
|---|---|---|---|
| 3,305,550 | 2/1967 | Banzhof, Jr. | 427/81 |
| 3,573,991 | 4/1971 | Lenfant et al. | 136/120 |
| 3,591,421 | 7/1971 | Schultze et al. | 136/120 |
| 4,044,715 | 8/1977 | Urai et al. | 118/50 |
| 4,287,232 | 9/1981 | Goller et al. | 427/113 |
| 4,313,972 | 2/1982 | Goller et al. | 427/113 |
| 5,158,722 | 10/1992 | Ilic et al. | 264/40.1 |
| 5,286,294 | 2/1994 | Ebi et al. | 118/50 |

Primary Examiner—Laura Edwards
Attorney, Agent, or Firm—Thomas Schneck

[57] ABSTRACT

A system for infiltrating, with active materials, a porous substrate to form electrodes, typically used for batteries, is described that features a vacuum device having a dynamic distribution assembly which allows for continuous and controlled deposition of electrochemical active materials onto a substrate, as the substrate moves therethrough, while preventing the active materials from leaving the vacuum chamber before infiltrating the substrate. The vacuum device includes a vacuum chamber, in fluid communication with a supply of active materials, and a vacuum pump, disposed within the vacuum chamber. The vacuum chamber includes an inlet and an outlet, positioned opposite to the inlet. The first and second opposed major surfaces and a plurality of voids extend therebetween. While disposed within the vacuum chamber, the vacuum pump creates a pressure differential between the first and second surfaces. In this fashion, a quantity of the active materials is drawn into the vacuum chamber, defining detached active material.

15 Claims, 4 Drawing Sheets

SYSTEM AND METHOD FOR IMPREGNATING A MOVING POROUS SUBSTRATE WITH ACTIVE MATERIALS TO PRODUCE BATTERY ELECTRODES

TECHNICAL FIELD

The present invention pertains to the field of electrochemical cells. Specifically, the present invention pertains to a method and system for producing electrodes for batteries.

BACKGROUND ART

Electrodes for use in electrochemical cells, such as fuel cells or batteries, are well known in the art. Techniques employed for manufacturing these electrodes typically involve the use of solvents to suspend an electrochemically active materials to be coated onto a substrate. The mixture of solvent and active materials has the consistency of a paste or slurry and includes active materials and a binder, such as polyvinylidenedifluoride (PvdF). The paste, or slurry, electrode mixture may then be applied to an appropriate current collector after which the solvent is removed, forming electrode material. The electrode material may then be cut to appropriate sizes. Recently, the electrode forming techniques that require solvents have posed formidable problems in view of current environmental legislation. The solvents used in the aforementioned processes present safety hazards, requiring costly storage, handling and disposal procedures.

U.S. Pat. No. 3,573,991 to Lenfant et al. discloses an electrostatic projection technique of forming an electrode. The electrostatic projection involves, inter alia, imposing a charge on a support, imposing an opposite charge on the particles of powdered material which is to be applied to the support as a layer, and fluidizing the charged particles of powder above the oppositely charged support. The powder is attracted to, and coats on, the support. Thereafter, the support is subjected to curing processes.

U.S. Pat. No. 3,591,421 to Schultze et al. discloses a plurality of processes for forming electrodes, one of which includes distributing a hydrophobic polymer powder within the pores of a porous substrate. The substrate is disposed within a chamber and the polymer powder is whirled up, within the chamber, and thrown against one side of the substrate, while an intermittent vacuum is applied. In this fashion, the distribution of powder material, within the substrate, may be arranged as desired, dependent upon the application for the resulting electrode. The substrate is then subjected to compression and sintering treatment.

U.S. Pat. Nos. 4,287,232 and 4,313,972, both to Goller et al., disclose a dry method for making an electrochemical cell electrode. The methods involve, inter alia, depositing a layer of dry carbon/hydrophobic polymer powder on the surface of a substrate by dispersing the powder in a cloud chamber over the substrate. The powder is pulled onto the substrate by a vacuum disposed thereunder. The electrode is subsequently compacted and sintered.

U.S. Pat. No. 5,158,722 to Ilic et al. discloses a process and apparatus for forming electrodes without solvents that includes, inter alia, introducing a dry powder mixture of electrochemically active materials and a binder into a metal mesh, which serves as a current collector. The dry powder mixture is introduced into the metal mesh from opposing sides. To that end, two strips of the dry powder mixture are simultaneously rolled out from opposite sides of a gap, developed between a roller, while a lattice, or net-like, current collector enters therebetween. In this fashion, the current collector is coated on both sides with the dry powder mixture, filling the interstices of the metal mesh. A problem with the aforementioned electrode forming machine concerns the controlled deposition of the active materials.

What is needed, therefore, is a method and system for continuously impregnating active materials into a moving substrate while actively controlling the density distribution of the active materials disposed therein.

SUMMARY OF THE INVENTION

A system for infiltrating, with active materials, a porous binder fabric and laminating the same to a current collector to form electrodes, typically used for batteries, is described that features a vacuum device having a dynamic distribution assembly which allows for continuous and controlled deposition of active materials onto the binder fabric, as the fabric moves therethrough. A sealing assembly is also included which prevents the active materials from leaving the vacuum chamber before infiltrating the fabric. The vacuum device includes a vacuum chamber, in fluid communication with a supply of active materials, and a vacuum pump, connected to the vacuum chamber. The vacuum chamber includes an inlet and an outlet, positioned opposite to the inlet. The fabric has first and second opposed major surfaces and a plurality of voids extending therebetween. The vacuum pump creates a pressure differential between the first and second surfaces. In this fashion, a quantity of the active materials is drawn into the vacuum chamber, defining detached active materials. A portion of the detached material fills a subset of the voids, defining attached materials. A conveyor apparatus, having a belt, frictionally engages the substrate and moves the same along a path between the inlet and the outlet.

The dynamic distribution assembly includes a movable brush, having a circular cross-section. The brush is pivotally mounted proximate to the outlet to rotate about an axis extending transverse to the path. The brush is in frictional engagement with the substrate to remove detached active materials disposed upon the first surface. The brush extends across the extent of the outlet.

A problem encountered with employing the brush concerned accumulation of detached active materials thereabout. To avoid this problem, the outlet is disposed at a higher elevation than the inlet so that the path, over which the substrate travels, lies in a plane that forms an angle with respect to gravity. In this manner, detached active materials, which are removed from the first surface by the brush, moves under force of gravity and air flow toward the inlet.

BEST MODE FOR CARRYING OUT THE INVENTION

Figure 1:
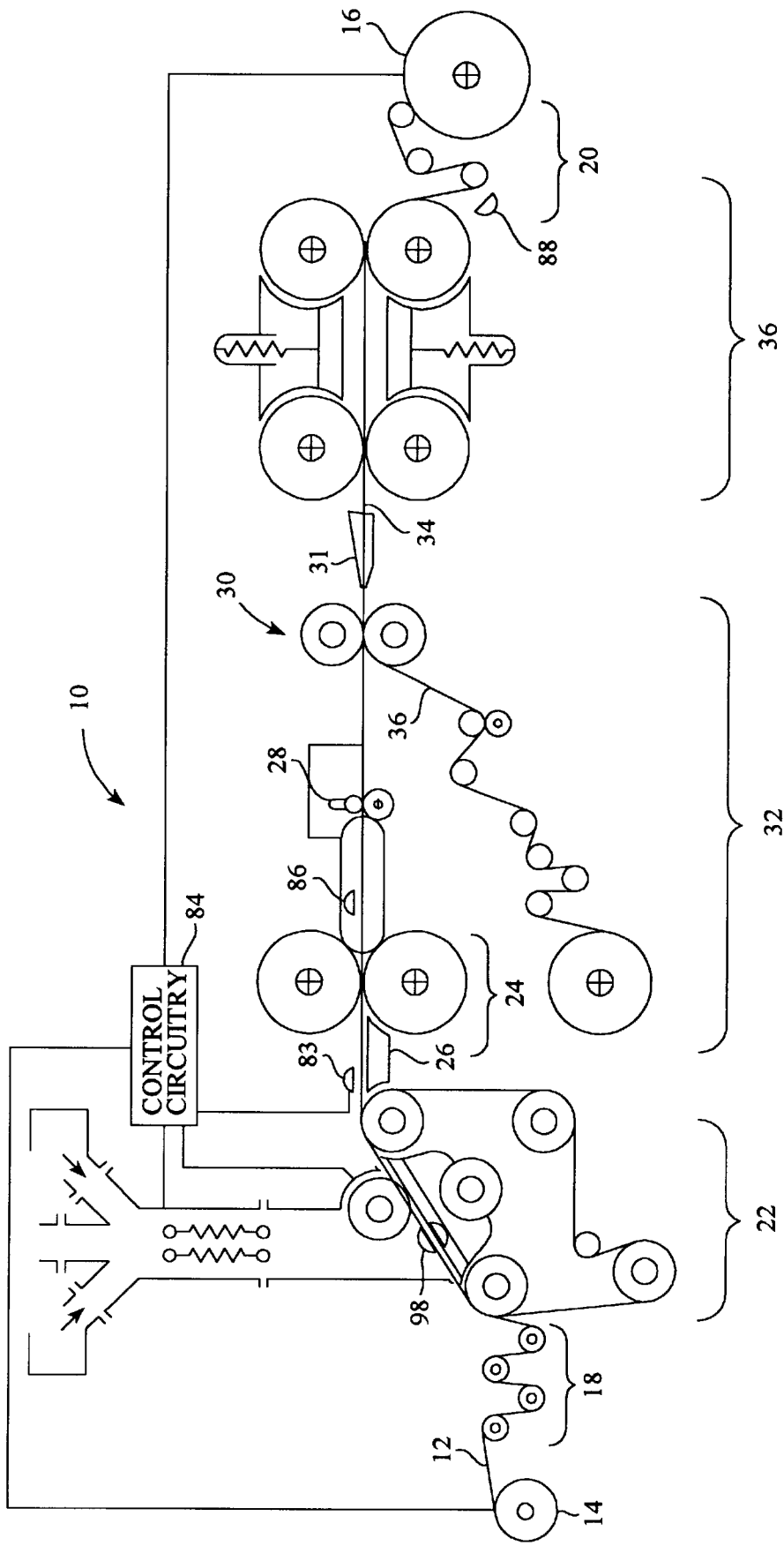
FIG. 1 is a plan view of an electrode forming machine incorporating a system for impregnating, with active materials, a substrate consisting of a mesh material having plurality of voids, in accord with the present invention.

Referring to FIG. 1, an electrode forming machine 10 includes a supply of non-woven mesh material 12 extending between a supply roller 14 and take-up roller 16. First and second pulley mechanisms 18 and 20 maintain tension in the fabric material 12, with the first pulley mechanism 18 positioned proximate to the supply roller 14, and the second pulley mechanism 20 positioned proximate to the take-up roller 16. An active materials deposition system 22 is disposed between the supply and take-up rollers 14 and 16, with the mesh material 12 passing therethrough, discussed more fully below with respect to FIG. 2.

Referring again to FIG. 1, a pair of spaced-apart compression rollers 24, each of which is positioned on opposite sides of the substrate 12, is disposed between the deposition system 22 and the take-up roller 16. After the substrate 12 exits the active materials deposition system 22, it passes over a transition block 26 and then between the compression rollers 24. Thereafter, the substrate 12 is shaped by an edge trimmer 28 to ensure parallel edges and then fed into the laminating rollers 30 of the current collector feeding system 32. A laminated current collector 34 is formed by a folding device 31 that folds the mesh material 12 so as to surround the current collector 36. After exiting the folding device 30, the laminated current collector 34 is subjected to compression and curing treatments by the compression heating apparatus 36. The take-up roller 16 is positioned to receive the laminated collector 34 after exiting compression heating apparatus 36.

Figure 2:
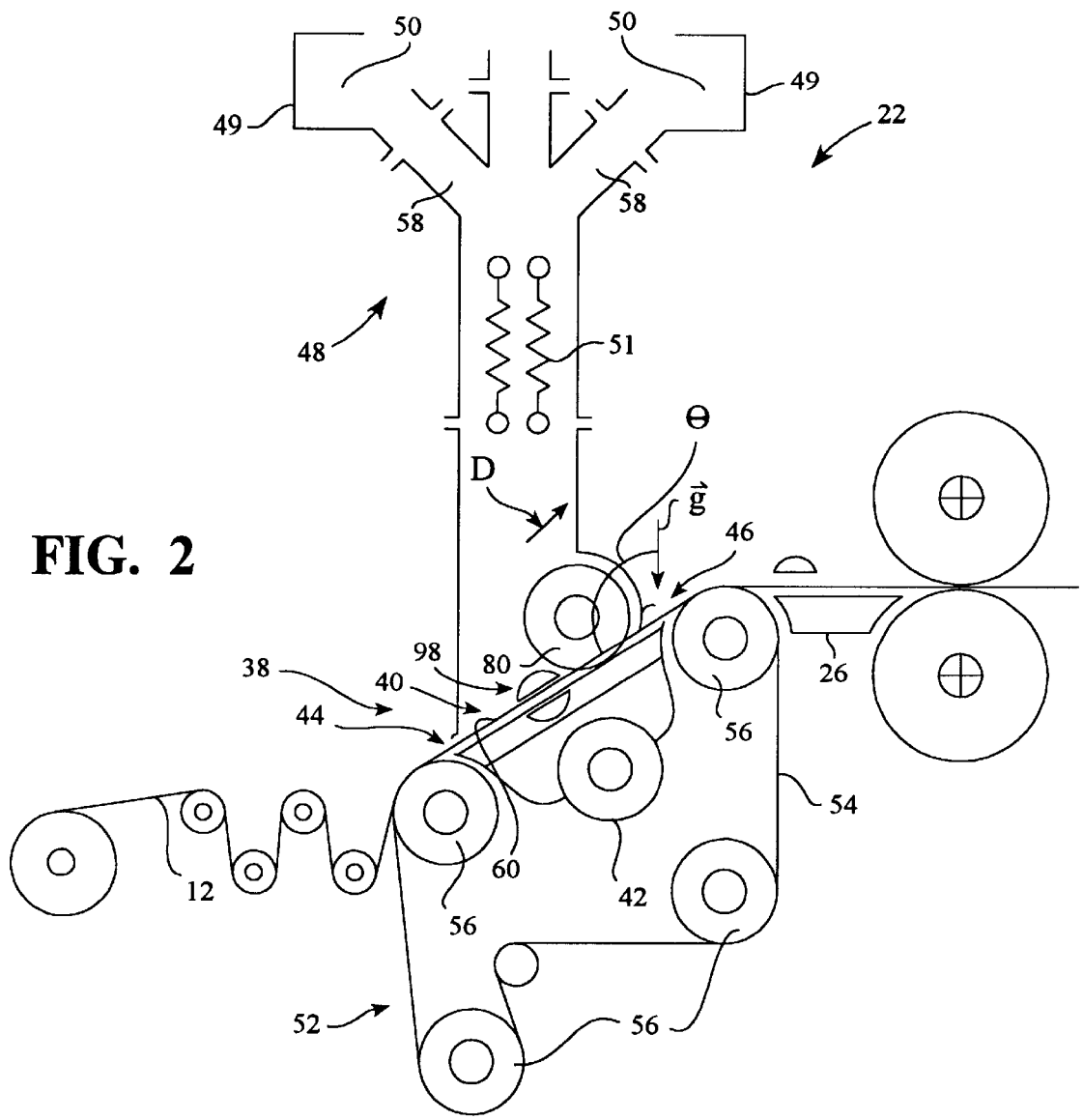
FIG. 2 is a detailed view of the impregnating system shown in FIG. 1.

Referring to FIG. 2, the active materials deposition system 22 consists of a vacuum device 38 that has a vacuum chamber 40 and a vacuum pump 42 connected to the vacuum chamber 40. The vacuum chamber 40 includes an inlet 44 and an outlet 46, positioned opposite to the inlet 44. A mixing manifold 48 is in fluid communication with the vacuum device 38 and includes metering devices 49 having a supply of active material 50 and a mixing device 51. The metering devices 49 are disposed at one end of the mixing manifold 50, and the vacuum device 38 is disposed at an opposite end, with the mixing device 51 disposed therebetween. A conveyor apparatus 52 includes a porous belt 54 that passes between the inlet 44 and the outlet 46 under power of a pulley system shown generally as pulleys 56. The porous belt includes a plurality of link members 54a defining a plurality of gaps 54b therebetween, shown more clearly in FIG. 4. The active materials may be any suitable electroactive species that provides readily available sites of electron transfer. Referring again to FIG. 2, the active materials typically consist of solid reactants in powder form which enter the mixing manifold 50 through the intake ports 58. Examples of such active materials may include $Li_xCoO_2$ or $Li_xMn_2O_4$.

Figure 3:
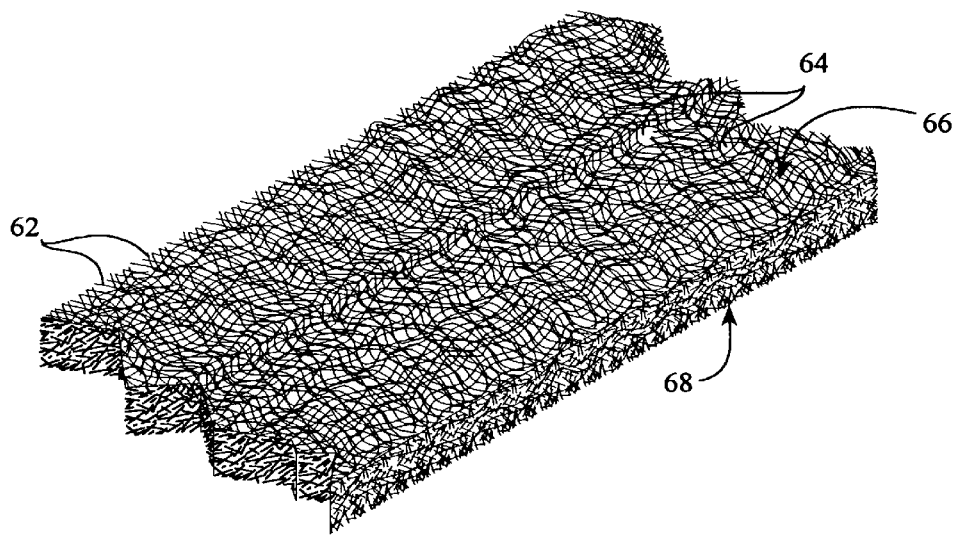
FIG. 3 is a perspective view of a non-woven substrate used to form an electrode in accordance with the present invention.

Referring to both FIGS. 2 and 3, the mesh material 12, disposed within the active materials deposition system 22, extends between the inlet 44 and the outlet 46 and is referred to as the substrate 60. The mesh material 12 and, therefore, the substrate 60, is characterized in that it is formed from a plurality of overlapping strands 62 of thermoplastic polymer, e.g. PvdF. The overlapping strands 62 are aligned so that a plurality of voids 64 extend between first and second opposed major surfaces 66 and 68 of the substrate 60, placing the same in fluid communication. The substrate 60 serves as the binder material for the finished electrode. As a result, the mesh material 12 is formed so that any given length of the same represents the minimum percentage of binding material necessary to produce the finished electrode.

In operation, the belt 54 of the conveyor apparatus 52 frictionally engages the substrate 60 and moves the same along direction "D" from the inlet 44 and to the outlet 46. The vacuum pump 42 creates a pressure differential between the opposed major surfaces 60 and 62 by drawing air through an air intake of the mixing manifold 48. The pressure differential draws a quantity of the active materials through the intakes 52, with the mixing manifold 48 being adapted to establish a rate at which said active materials pass therethrough in relation to the pressure differential. A portion of the active materials entering vacuum chamber 40 fills a subset of the voids 64, with a residual amount of the active materials being left to rest against the first major surface 66. In this fashion, the active materials attach to the substrate as the substrate 60 is moved, by the belt 54, from the inlet 44 to the outlet 46.

It is necessary to deposit a controlled quantity of the active materials into the substrate 60 to achieve the desired electrical characteristics and avoid structural degradation of the finished product. For example, depositing excessive amount of active materials onto the substrate 60 will often produce a brittle electrode that will crack when subject to compression and sintering treatments. To that end, the velocity at which the conveyor apparatus 52 moves the substrate 60 through the chamber 40 is matched with the flow rate of the active materials therethrough so that the requisite number of voids 64 are filled. The flow rate of the active materials is dependent upon the mixing manifold 50 and the pressure differential between the first and second major surfaces 66 and 68, which, in turn, is dependent upon the porosity of the substrate 60, as well as the vacuum created by the vacuum pump 42.

Figure 4:
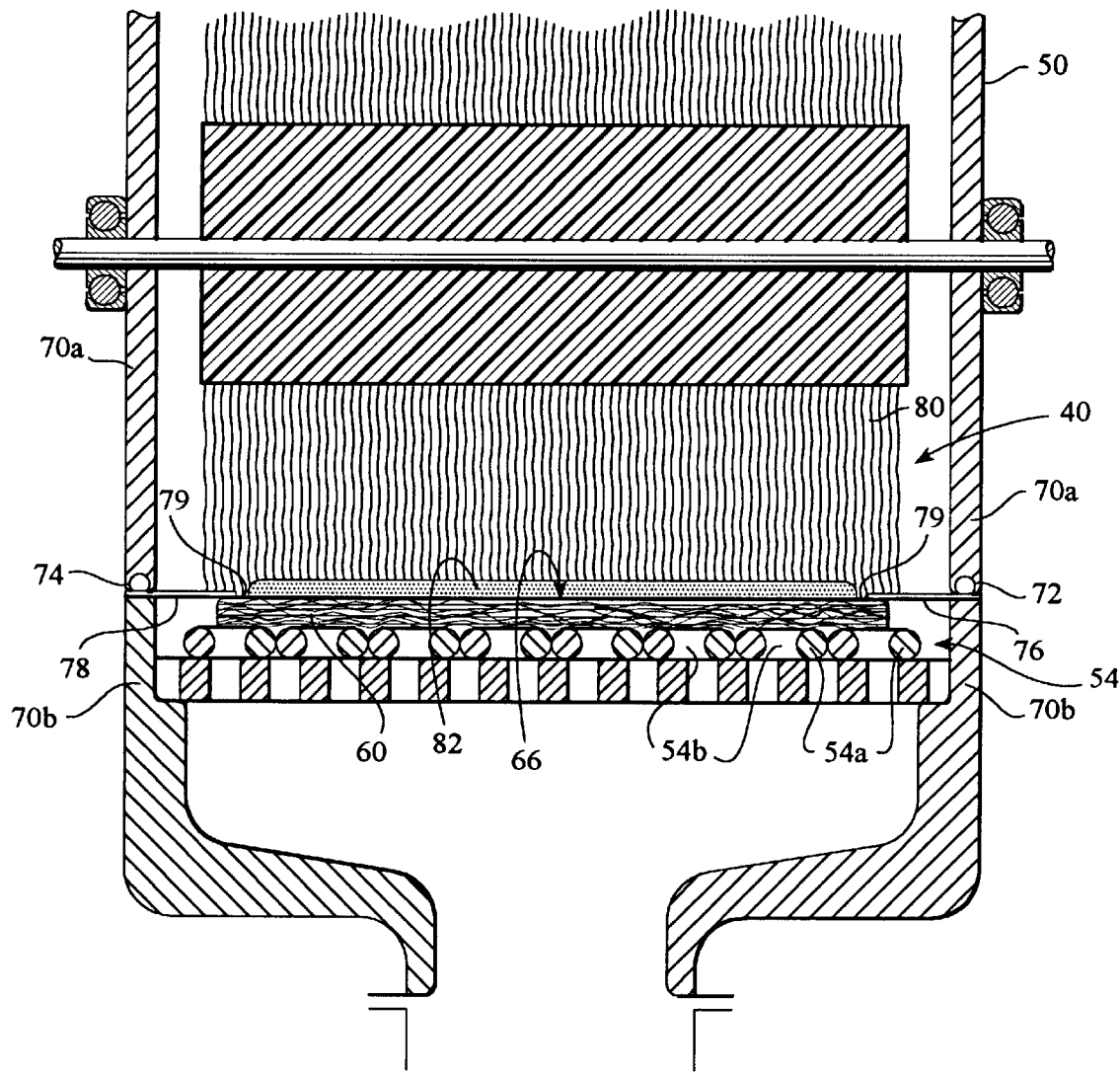
FIG. 4 is a partial cross-section view of an active materials vacuum deposition system shown in FIG. 1 and taken across lines 4—4.

Referring also to FIGS. 1, 2 and 4, to provide the requisite pressure differential, the vacuum device 38 includes a pair of spaced-apart upper side-walls 70a, each of which are disposed on opposite sides of the substrate 60, and a pair of spaced-apart lower sides-walls 70b, each of which extends from one of the upper side-walls 70a with a gasket 72 and 74, respectively, disposed therebetween. The upper 70a and lower 70b side-walls extend between the inlet 44 and the outlet 46. Extending from the gasket 72, in a direction transverse to direction D, toward gasket 74, is first a sealing member 76 that terminates proximate to the first surface 66 of the substrate 60. Similarly, a second sealing member 78 extends from gasket 74 towards gasket 72 and terminates proximate to the first surface 66. The first and second sealing members 76 and 78 reduce the air flow traveling around the edges 79 of the substrate 60 and through the belt 54.

To control the distribution of active material in the mesh material 12, a movable brush 80 is disposed proximate to the outlet 46, so as to impinge on the first surface 66. In this fashion, excess active materials 82 is removed so as to control the amount of active material present on the first surface 66. Specifically, as the substrate 60 moves from inlet 44 toward outlet 46, an increasing number of voids 64 become filled with active materials. When located proximate to the outlet 46, a sufficient number of voids 64 have been filled to substantially block fluid communication between the first 66 and second 68 surfaces of the substrate 60. The frictional engagement of the moveable brush 80 with the first surface 66 reduces the amount of residual active material that egresses through the outlet 46. Although any type of moveable brush may be employed, it is preferred that moveable brush 80 have a circular cross-section and extend across the extent of the outlet 46.

In this arrangement, the moveable brush 80, as well as the first and second sealing members 76 and 78, prevent active materials that have not been disposed within a void 64, defining detached active materials 82, from exiting the vacuum chamber 40. Active materials is prevented from exiting the inlet 44 due to the high volummetric intake of fluid therethrough. As discussed above, an increasing number of voids 64 become filled as the substrate 60 moves from the inlet 44 toward the outlet 46. This produces a pressure gradient across the first surface 66. The pressure gradient is controlled so that it comports with a specified pressure profile consisting of a low pressure differential between the first 66 and second 68 surfaces, located proximate to the inlet 44 and a high pressure differential therebetween, proximate to the outlet 46. In this fashion, the vacuum present at the inlet 44 prevents active materials from exiting therethrough.

Referring again to FIG. 2, a problem encountered with employing the moveable brush 80 concerned accumulation of active materials thereabout. Specifically, as the substrate 60 travelled past the brush 80, the detached active materials, lying atop the first surface 66, would become accumulated proximate to the brush-substrate interface. To avoid this problem, the inlet 44 was positioned below the outlet 46 so that the substrate 60 travelled at an angle $\Theta$ with respect to a direction of gravity $\vec{g}$. The angle $\Theta$ is typically in the range of 30° to 45°. In this fashion, the detached active materials fall, under force of gravity and flow, towards the inlet 44. The pressure gradient across the first surface 66 results in a substantial portion of the detached material filling the voids 64 of the substrate as the same moves through the inlet 44. Specifically, the strong vacuum to which the first surface 66 is subjected, at the inlet 44, pulls the active materials toward the second surface 68.

Referring again to FIGS. 1 and 2, a mass sensor 83 is positioned opposite to the transition block 26 to detect the quantity of active materials deposited in the mesh material 12, as it leaves the deposition apparatus 22. The mass sensor 83 is in data communication with the control circuitry 84 and provides real-time feed-back by which to govern the operation of the deposition apparatus 22 and the take-up 14 and supply 16 rollers to ensure the proper quantity of active materials is present therein. The transition block 26 is provided to reduce, and preferably prevent, attached active material that detaches from the mesh material 12 and exits the voids 64 and is angled to be perpendicular with respect to gravity $\vec{g}$. Other sensors are provided to determine the operational characteristics of different processes in the machine 10, which are well known in the art. For example, a thickness measurement detector 86 is positioned to sense the mesh material exiting the compression rollers 24, and a final thickness gauge 88 is disposed to sense the laminated current collector 34 exiting the compression heating apparatus 36. Each of the gauges 86 and 88 are in data communication with the control circuitry 84 to provide real time feedback control of the machine 10.

Referring to FIGS. 1, 2, 3 and 5, the laminated current collector 34 consists of a current collector 90, such as copper, or any other suitable conductor, compressed between two sheets 92 and 94 of the mesh material 12. The sheets 92 and 94 are orientated so that the second major surface 68 faces the current collector 90, with the first major surface 66 of both sheets forming an outer surface. It is preferred that the active materials fill the voids 64 of the mesh material 12 so that a conductive path, indicated as 96, is formed between the current collector 90 to the outside surface. The conductive path 96 is formed by having a contiguous line of active materials from the outside surface to the current collector 90.

It has been found that proper orientation of the active materials as they fill the voids 64 facilitates production of the conductive paths 96. To that end, an oscillator 98 may be coupled to transmit acoustic energy into the vacuum chamber 40. The acoustic energy may be used to facilitate filling the voids 64 and properly orienting the particulate matter.

Figure 5:
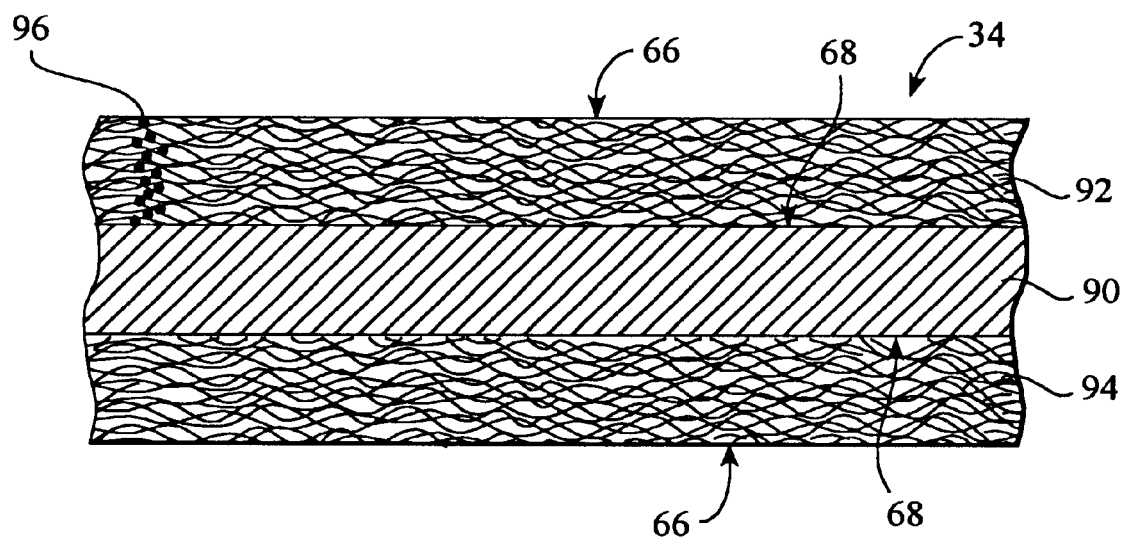
FIG. 5 is a partial cross-section view of a laminated current collector, in accord with the present invention.

Referring to FIGS. 1 and 5, typically the density of the active materials in the mesh material 12 varies. The active materials fill substantially all the voids 64 proximate to the first surface 66, forming a substantially uniform layer. The active materials become less dense proximate to the second surface 68, leaving a larger number of unfilled voids 64. Thus, the density of the active materials in the mesh 12 defines a gradient density between the first 66 and second 68 surfaces. This is advantageous when forming the laminated current collector 34, because the mesh material 12 tends to retract away from the current collector 90 during curing treatments. By leaving a greater quantity of voids 64 unfilled proximate to the current collector 90, the mesh material tends to bind to itself during the sintering treatments, thereby being tightly bound about the current collector 90. This is particularly important considering that the mesh material 12 consists of the binder material in the finished electrode.

We claim:

1. A system for impregnating, with active materials and performance enhancers, a mesh material having first and second opposed major surfaces and a plurality of voids extending therebetween, said system comprising:

a supply of said active materials having opposed major surfaces;

a vacuum pump;

a vacuum chamber in fluid communication with both said vacuum pump and said supply, said vacuum chamber having an inlet and an outlet, positioned opposite to said inlet, with a portion of said mesh material being within said vacuum chamber;

a conveyor apparatus frictionally engaging and moving said mesh material along a path, supported in a plane forming an angle with respect to a direction of gravity, between said inlet and said outlet, with said vacuum pump producing a pressure differential between said first and second surfaces to draw a quantity of said active materials into said vacuum chamber, defining detached active materials; and distribution means, disposed within said vacuum chamber, for controlling an amount of said detached active materials disposed on one of said opposed major surfaces.

2. The system as recited in claim 1 wherein said outlet is disposed at a higher elevation than said inlet.

3. The system as recited in claim 1 wherein said distribution means includes a movable brush, disposed proximate to said outlet, with said brush being in frictional engagement with said mesh material.

4. The system as recited in claim 1 wherein said distribution means includes a brush, disposed proximate to said outlet, pivotally mounted to rotate about an axis extending transverse to said path.

5. The system as recited in claim 1 further including a mixing manifold, in fluid communication with both said supply of active materials and said vacuum chamber, said mixing manifold establishing a rate at which said active materials pass therethrough in relation to a given pressure differential.

6. The system as recited in claim 1 further comprising a control means for governing the operations of said vacuum pump and said conveyor apparatus so as to maintain a pressure gradient across said first surface in a direction parallel to said path and in accordance with a preset pressure profile.

7. A system for impregnating, with electrochemical active materials, a mesh material having first and second opposed major surfaces and a plurality of voids extending therebetween, said system comprising:

a supply of said active materials;

a vacuum device, in fluid communication with said supply of active materials having a hollow body and a vacuum pump, said hollow body having an inlet and an outlet, positioned opposite to said inlet, with said substrate disposed therein and said vacuum pump to produce a pressure differential between said first and second surfaces to draw said active materials into a subset of said plurality of voids;

a conveyor apparatus frictionally engaging and move moving said mesh material along a path, supported in a plane forming an angle with respect to a direction of gravity, between said inlet and said outlet; and control means for controlling the operations of said vacuum device and said conveyor apparatus so as to maintain a pressure gradient across said first surface in a direction parallel to said path and in accordance with a preset pressure profile.

8. The system as recited in claim 7 further including a mixing manifold, in fluid communication with both said supply of active materials and said vacuum device, with said mixing manifold establishing a rate at which said active materials pass therethrough in relation to a given pressure differential.

9. The system as recited in claim 7 further including a movable brush, having a circular cross-section, pivotally mounted proximate to said outlet to rotate about an axis extending transverse to said path, with said brush being in frictional engagement with said mesh material to remove detached active materials disposed upon said first surface.

10. The system as recited in claim 9 wherein said outlet is disposed at a higher elevation than said inlet, with some active materials entering said subset defining attached active materials and the remaining active materials in said hollow body defining detached active materials, with a portion of said detached active materials moving, under force of gravity and an air flow, toward said inlet, thereby being prevented from exiting said outlet.

11. A system for impregnating, with active materials, a mesh material having first and second opposed major surfaces and a plurality of voids extending therebetween, said system comprising:

a supply of active materials;

a vacuum device, in fluid communication with said supply of active materials and including a vacuum chamber and a vacuum pump connected to said vacuum chamber, said vacuum chamber having an inlet and an outlet, positioned opposite to said inlet, with said vacuum pump creating a pressure differential between said first and second surfaces to draw a quantity of said active materials into said vacuum chamber, defining detached active materials;

a movable brush, disposed within said chamber, said brush being in frictional engagement with said mesh material; and a conveyor apparatus having a belt frictionally engaging said mesh material and causing the same to move along a path between said inlet and said outlet, wherein a portion of said detached active materials enters a subset of said plurality of voids in response to said pressure differential, defining attached active materials, with said brush removing detached active materials located proximate to said first surface as said mesh material moves toward said outlet, thereby preventing detached active materials from passing therethrough.

12. The system as recited in claim 11 wherein said brush is positioned proximate to said outlet, with said outlet being disposed at a higher elevation than said inlet, with the detached active materials removed from said first surface by said brush, moving under force of gravity and an air flow, toward said inlet, thereby being prevented from exiting said outlet.

13. The system as recited in claim 12 wherein said hollow body is positioned to allow an airstream to ingress into said hollow body via said inlet, creating a pressure gradient across said first surface, in a direction parallel thereto, thereby preventing said active materials, moving under said force of gravity and said air flow, from exiting through said inlet.

14. The system as recited in claim 13 further including a control means for governing the operations of said vacuum device and said conveyor system so as to maintain said pressure gradient in accordance with a preset pressure profile, said present pressure profile consisting of a low pressure differential between said first and second surfaces, located proximate to said inlet and a high pressure differential therebetween, located proximate to said outlet.

15. The system as recited in claim 14 further including a mixing manifold in fluid communication with both said supply of active materials and said vacuum chamber and means for oscillating said detached active materials traveling through said vacuum chamber, whereby said mixing manifold establishes a rate at which said active materials pass therethrough in relation to a given pressure differential, said brush pivotally mounted to rotate about an axis extending transverse to said path.

* * * * *